Aug. 29, 1933.  E. WOLF  1,924,174
MEANS AND METHOD OF MEASURING DISTANCE
Filed May 19, 1930  2 Sheets-Sheet 1
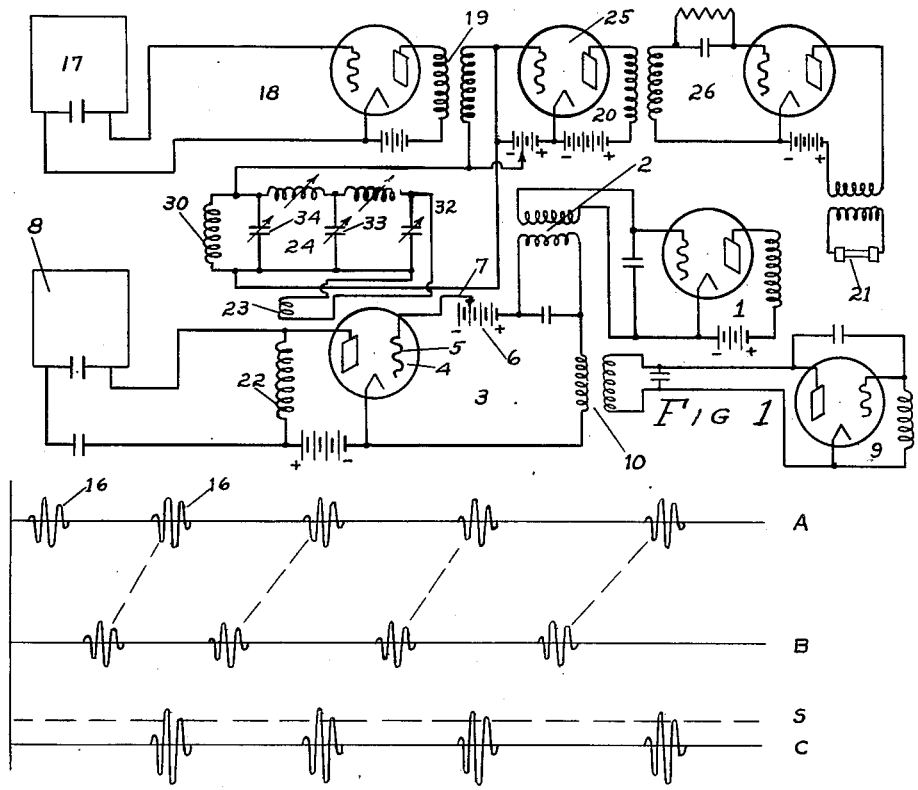
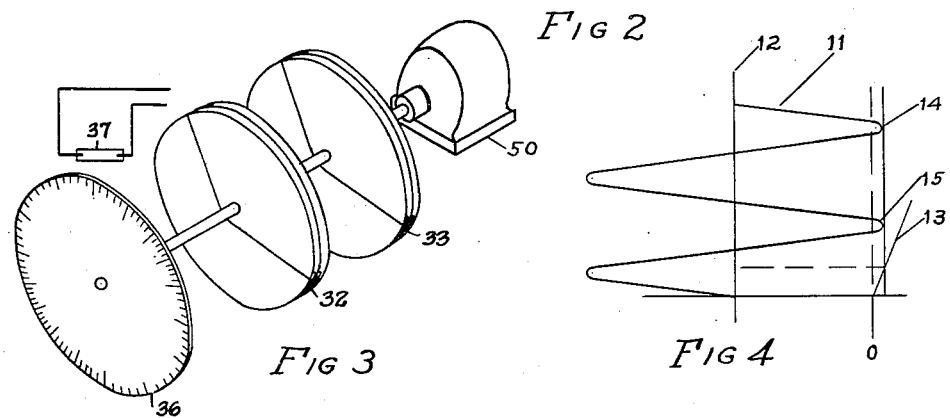
INVENTOR Aug. 29, 1933.  E. WOLF  1,924,174
MEANS AND METHOD OF MEASURING DISTANCE
Filed May 19, 1930   2 Sheets-Sheet 2
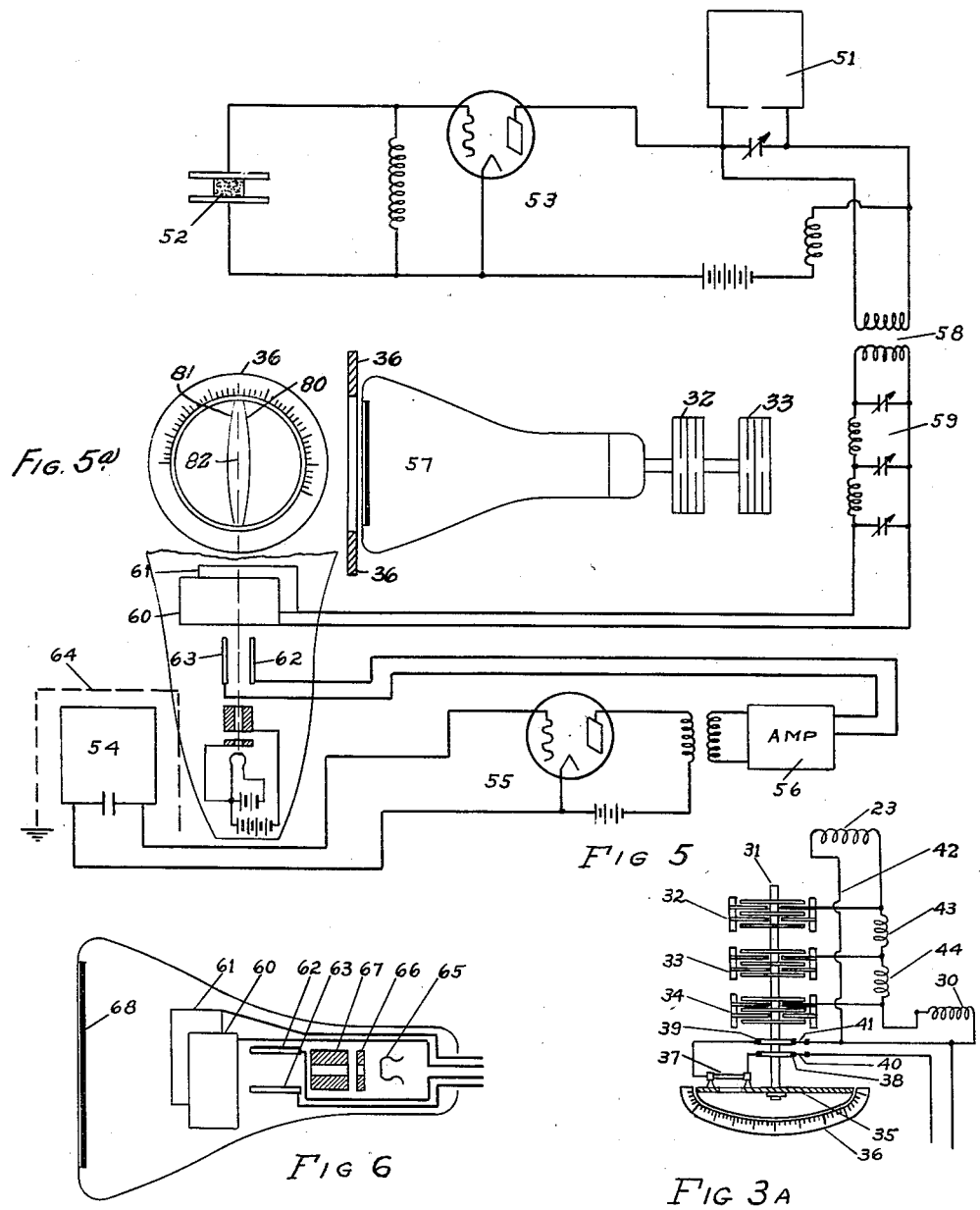
INVENTOR
Ezekiel Wolf

Patented Aug. 29, 1933

1,924,174

UNITED STATES PATENT OFFICE

1,924,174

MEANS AND METHOD OF MEASURING DISTANCE

Ezekiel Wolf, Dorchester, Mass., assignor to Submarine Signal Company, Boston, Mass., a Corporation of Maine Application May 19, 1930. Serial No. 453,731

14 Claims. (Cl. 250—1)

The present invention relates to method and apparatus for measuring distance by the aid of radiated wave energy and particularly by the use of electromagnetic waves. The invention is applied in particular to the measurement of the height of an aircraft from the ground or from other reflecting objects.

In the present invention electromagnetic wave energy is transmitted and received in the vicinity of the transmitting source after it has been reflected from the object or surface whose distance is to be measured. The directly transmitted and reflected waves are then synchronized by either retarding the direct wave or the reflected wave according to the method it is desired to use. The transmitted wave may be of a sinusoidal form and it may be continuous or interrupted although it may also take the form of single impulses. In using interrupted waves, damped wave trains or single impulses, the wave energy is emitted periodically at definite time intervals.

When periodically emitted waves are used, the reflected wave energy will likewise be received in the same periodic intervals, lagging, however, a time interval corresponding to the time necessary for the wave to travel to the reflecting object and be returned. In this method of operating the invention a portion of the wave from the transmitting source may be retarded or delayed before being impressed upon the receiving source and in this manner a synchronism may be obtained between the reflected wave and the impressed direct wave when the retardation is of a value corresponding to the time interval.

In such cases the direct impulse may correspond to the reflected wave of the same emitted impulse. In the case where the reflected wave is retarded, the impulses may be made to correspond to the following transmitted direct wave. Either method of operating the invention may be employed, although in some cases it is preferable to retard the direct wave rather than the echo picked up by the receiving circuit.

In the present invention the method of measuring the distance is made automatic by the use of a progressive retarding element which at some point of its setting will produce a synchronism between the directly impressed wave and the echo.

The present invention has a particular utility in increasing the safety of flying aircrafts in weather of difficult visibility. The danger of approaching invisible objects has long been recognized in the development of aviation, and many means have been tried for insuring safe operation of an aircraft under these conditions. Various altimeters have been devised some of which have proved to be of considerable merit and have aided somewhat in reducing this danger. Some of these instruments for measuring heights are dependent purely upon barometric measurements while others, such as the condenser altimeter which measures the height of an aircraft by measurement of the capacity between the craft and the ground, operate irrespective of barometric conditions. The condenser method of measuring aircraft heights is chiefly useful in low heights where its accuracy is the greatest.

Other forms of altimeters employing electrical means have been devised and operated with some degree of success, such, for instance, as the method of standing waves in which a tally is made of the number of nodes and loops the aircraft has gone through in ascending or descending. This method is not, however, wholly reliable since stray signals and failure to operate at any one time means a certain error for all other readings.

In the present system the method employed gives a definite indication of the height which may be made continuous if desired. The indication may be given on a scale which is easily read. Further, the distance is measured every time an impulse is emitted and as a result, therefore, as many measurements are made per second as the frequency of the periodic emission of the wave energy.

The invention and its advantages will be more clearly understood from a consideration of the description taken in connection with the drawings showing an embodiment of the same. In the drawings Fig. 1 shows a diagrammatic circuit arrangement of the invention; Fig. 2 illustrates a principle of operation; Figs. 3 and 3a illustrate details of the invention Fig. 3 being a modification of the means illustrated in Fig. 3a; Fig. 4 shows a curve explaining the method of operating the circuit; Fig. 5 shows a further modified form of the invention; Fig. 5a shows an end view of the cathode ray tube element shown in Fig. 5; and Fig. 6 illustrates a detail of an element used in the modification of Fig. 5.

In Fig. 1, 1 represents an oscillatory circuit for providing high frequency oscillations which are impressed by the coupling coil 2 upon the emitting circuit 3. The emitting circuit employs a control tube 4 having a grid 5 which normally is biased by the battery 6 by the adjustable tap 7 so that the desired bias may be impressed upon the circuit. The plate of the tube 4 is connected to the loop antenna 8 for emitting the radiated energy, though any other radiation means may be used. Normally the grid bias battery 6 is such that the tube 4 has no electron stream except when this bias is overcome by the peak of the wave of the oscillatory circuit 1. A second oscillatory circuit 9 is provided of a much higher frequency than the oscillatory circuit 1, and the energy of this circuit is continually impressed upon the transmitting circuit 3 by means of the coupling coil 10. Due, however, to the blocking of the tube 4 no energy is radiated from the antenna 8 until the bias of the battery 6 is overcome by the oscillatory circuit 1 which occurs periodically as illustrated by the vibrations shown on the line A of Fig. 2. The principle of operation of this circuit may be more clearly understood by consideration of the curve shown in Fig. 4. The curve 11 represents the frequency of the circuit 1 and the line 12 represents the bias of the battery 6 on the transmitting circuit. The abscissæ represents, in this figure, grid volts while the ordinate represents plate current. The curve 13 shows this characteristic for the tube 4. It will be noted, therefore, that plate current is flowing in the tube 4 only at the peaks 14 and 15 of the vibrations 11 when the vibratory circuit 1 overcomes the biasing battery 6.

At these points the circuit 3 becomes conductive and allows the high frequency vibrations of the circuit 9 to be impressed upon the antenna circuit 8. The high frequency vibrations of the circuit 9 are preferably less than five meters while the frequency of the oscillatory source 1 is approximately twice the greatest distance that the apparatus is to be used.

In fact I have discovered that when an oscillatory source is used, the frequency of the waves best to use is of the order from 1 to 10 centimeters. This comes from the fact that these very short waves may be emitted and received without sustained oscillations on the part of the transmitting and receiving circuit and, further, their wave length is so short that a great number may be emitted in one train of vibrations whereas if they were longer, this would be impossible except for very great distances.

The number of vibrations in a train times the wave length must always be a less distance than twice the distance to be measured, and preferably should be of a different order of magnitude, as otherwise the transmitted and reflected waves will interfere.

In this manner there is emitted, as shown on line A of Fig. 2, high frequency vibrations 16, 16, etc. These vibrations travel to the reflecting surface and are picked up again after reflection by the antenna 17 and impressed upon the receiving circuit 18 which may be of the usual type of radio receivers.

The impulse from the circuit 18 is impressed by the coupling transformer 19 upon a grid biased circuit 20, the bias of which may be adjustable to the point where the signal received directly from the antenna 8 upon the antenna 17 will not operate the indicator 21. Indicator 21 will only operate when the reflected signal and the signal impressed directly from the transmitting circuit upon the receiving circuit are in phase. The signal from the transmitting circuit is impressed directly upon the receiving circuit through the coupling of the coils 22 and 23, impressing a small portion of the impulse of the wave in the emitting circuit upon the input end of the retardation line 24. The output end of the retardation line 24 is connected across the secondary of the coupling coil 19 and when the reflected impulse picked up by the antenna 17 is in phase with the retarded impulse transmitted through the coupling coil 23 and the retardation line 24, the voltage across the grid circuit of the tube 25 will be sufficient to cause a plate current to flow in the tube. This vibration may be rectified in the circuit 26 and produce an indication by flashing the indicator 21.

In the description just mentioned above, nothing has been said concerning the wave which is directly transmitted from the antenna 8 to the receiving antenna 17. This directly transmitted portion of the periodic signals may be made very small by shielding and directing the antenna loops 8 and 17. It is only necessary in the receiving circuit that this directly received portion of the signal is weaker than the reflected portion in order to prevent the signal from operating the indicator. The device will still operate, however, if this signal is not eliminated. Under these circumstances a signal will always be received at the zero of the scale.

The direct wave may be further eliminated by the use of the coupling coil 30 which may feed in a reverse manner a portion of the signal from the sending circuit through its coupling with the coil 22 upon the grid biased circuit 20.

Means for effecting a retardation of the direct wave is shown in greater detail in Figs. 3 and 3a. In Fig. 3a there is shown a rotatable shaft 31 on which is mounted the rotating plates of the variable condensers 32, 33 and 34. On the same shaft is mounted a disk 35 which rotates with respect to a fixed scale 36. It should be noted that in Fig. 3a the disk 35 and the scale 36 is somewhat distorted so as to show more clearly the relation of the parts of the indicating system. The disk 35 carries an indicating tube 37 which may be a neon discharge tube or any other such tube responsive to rapid vibrations. The electrodes of the discharge tube 37 are connected to the commutators 38 and 39 against which the brushes 40 and 41 respectively bear. The rotating plates of the condensers 32, 33 and 34 are grounded by the line 42 connected to the rotating plates through the brush 41. In Fig. 3a inductances 43 and 44 are shown as constant and the amount of retardation is varied only by varying the capacities 32, 33 and 34. As indicated in Fig. 1, it is possible to vary the inductances and capacities simultaneously, though for most purposes it will be sufficient to use simply a variable group of capacities. A semi-perspective view of the device is shown in Fig. 3 as driven by a motor 50. The driving means in case of an aircraft may be a motor or simply a propeller driven by the air current, since it is not necessary in the present system to maintain a constant speed of rotation of the disk 35. In Fig. 3 the neon tube 37 may be stationary and the scale 36 may rotate together with the variable condensers 32 and 33. It will be noted that in Fig. 3a the scale is fixed and the indicator is rotated with the plates varying the capacities in the condensers. The neon tube 37 in Fig. 3a corresponds to the tube 21 in Fig. 1, and is operated periodically when the direct and reflected impulses are brought in phase by the retardation means. This will occur every time that the retardation line is set in the correct position. The tube will at these times respond with the same number of flashes per second as the frequency of the emitted signals, and will, therefore, produce a continuously visible signal at these times.

If the rotating retardation line is operated at a speed greater than approximately 16 vibrations per second, then a continuous indication will be obtained at all times, since the eye is unable to distinguish individual vibrations occurring as rapidly as 16 per second.

In Figs. 5 and 6 there is shown a modification of the invention disclosed in the other figures. In this modification a continuously vibrated electromagnetic wave is transmitted in preference to periodic signals. This continuous wave may be transmited by the antenna 51 at a frequency controlled by the piezoelectric oscillator 52 in the oscillatory circuit 53. The continuous wave after being reflected from the object whose distance is to be measured is received by the antenna 54 and passed through a receiving circuit 55 and an amplifier 56 to an indicator 57. A portion of the direct wave is transmitted to the indicator 57 through the coupling transformer 58 and the variable retardation line 59. The indicator 57 is mounted on the same shaft with the retardation line 59 which is of the same construction as the retardation line shown in Fig. 3a. The continuous wave may be of a sinusoidal form and may, after being passed through the retardation line 59, be impressed upon two control plates 60 and 61 of the indicator 57 which is of the type of the Braun tube or a cathode ray tube. The received wave after it is passed through the receiving circuit may be impressed upon another set of control plates 62 and 63 arranged parallel to each other and perpendicular to the control plates 60 and 61.

In Fig. 5a the scale 36 is positioned before the cathode ray tube and the lines indicated by 80, 81 and 82 are the luminous patterns explained below.

The intensity of the direct and reflected waves may be balanced, if desired, though this is not necessary. In the system as operated in Fig. 5 at zero heights when the compensating line has zero compensation, the cathode ray indicator will produce a luminous straight line 82 which has an angle of forty-five degrees with the plates 60, 61, and 62, 63. When the compensation at zero height is not zero, an ellipse 80, 81 will be produced on the indicator the width of the same being dependent upon the amount of compensation.

For any particular height within the range of operation of the device, the variable retardation line 59 will at some point bring the reflected and the directly transmitted wave into phase, and will in this position produce a straight line. The position of the indicator relative to the scale at this setting will give a measure of the distance. In the system operated according to Fig. 5 it is preferable to shield the antenna 54 by a shield 64 so that the direct wave will not be picked up by the antenna 54. In addition to this shielding the antenna 54 may be directed as well as the antenna 51. The cathode ray tube is shown more in detail in Fig. 6 and comprises a heated filament 65, a shield 66, an anode 67 and the four plates 62, 63, 61 and 60. An electron beam is produced independently of the transmitting and receiving circuit by means of a potential difference actually applied between the anode 67 and the cathode 65.

The transmitted wave is preferably sinusoidal in form, for in this shape the voltage vectors applied across the plates 60, 61 and 62, 63 will produce a continuously rotating beam of light when the voltage phase on the two pairs of plates are ninety degrees apart. If the voltage vectors on the two plates are in phase, as is the case for zero height with zero compensation, a single line is produced passing through the geometrical center of the indicator 57. The indicator 57 may have a luminous material 68 on the inside of the tube in order to produce a sustained illumination.

With the modifications shown in Figs. 5 and 6, it is not necessary to produce periodic signals. However, in this system it is necessary to control within fairly accurate limits the frequency of the sinusoidal wave, since the time interval is measured indirectly as a function of the periodic wave.

Having now described my invention, I claim:

1. A system for measuring distance comprising means for periodically emitting an electromagnetic wave, means for receiving the direct waves, means for receiving the corresponding reflected wave after reflection from the object whose distance is to be measured, means for progressively retarding one of said waves, and means for indicating a synchronism of the direct and reflected wave, and a scale for indicating the distance at the position of the means when the indication is produced.

2. A system for measuring distance comprising means for periodically emitting an electromagnetic wave, means for receiving the direct waves, means for receiving the wave so emitted after reflection from the object whose distance is to be measured, means for retarding the direct wave comprising means for continuously varying the retardation of a retardation line to bring the direct and reflected waves into synchronism, means for indicating when said synchronism is obtained, and a scale associated with said means for indicating the distance.

3. A system for measuring distance comprising means for emitting periodically wave impulses, means for receiving the direct wave impulses, means for receiving said wave impulses after reflection from the object whose distance is to be measured, and means for measuring the time interval between the emission and reception of said wave impulses comprising means for progressively retarding one of said wave impulses including a retardation circuit adapted to have its retardation progressively increased in a cyclic fashion whose period is long compared to that of the period between wave impulses, means for indicating when the direct and reflected impulses are in phase and means associated therewith for reading the distance.

4. A system for measuring distance comprising means for emitting periodically wave impulses, means for receiving the direct wave impulses, means for receiving the reflected wave impulses after reflection from the object whose distance is to be measured, and means for measuring the time interval between the emission and reception of said wave impulses comprising an electrical retardation line including means for varying the retardation by rotating the elements thereof, a scale and an indicator, means for making one of said last two elements move with said rotating elements and relative to the other element, means for impressing one of said impulses on said retardation line, and means for operating the indicator when a synchronism between the direct and reflected impulse is had.

5. In a system for measuring distance by the use of electromagnetic waves and direct and reflected impulses, means for receiving the direct and reflected wave impulses, a retardation line having elements adapted to be rotated together to introduce a progressive time lag in the line, a scale, an indicator rotating with said elements and adjacent to said fixed scale, means for impressing one set of periodic impulses on said retardation line and means for operating the indicator when said set is in synchronism with a second set whereby an indication is produced relative to the scale.

6. In a system for measuring distance by means of direct and reflected electromagnetic waves, means for receiving the direct and reflected waves, a transmitting system transmitting at periodic intervals, a receiving system, and means for introducing in repeated cycles a progressive time lag between the transmitted and received impulses whereby they are synchronized at a setting of the progressive time lag, and means for producing a visual indication at said setting and a scale to indicate the distance said repeated cycles being of sufficient frequency to sustain vision.

7. In a system for measuring distance by means of direct and reflected electromagnetic waves, means for emitting periodic impulses, means for receiving the direct and reflected periodic impulses after reflection from the object whose distance is to be measured, adjustable means for synchronizing the emitted and received impulses, and means for producing an indication when said synchronism is obtained comprising a circuit having a bias adjustably set to just the point to prevent response from either impulse alone but not from the combined impulses when synchronized and an indicator operated thereby to indicate the amount of adjustment for synchronization and therefore the measure of the distance.

8. In a system for measuring distance by the aid of emitted and reflected electromagnetic waves in which periodic electromagnetic wave signals are emitted, means for receiving the direct and reflected wave, means for receiving a second direct wave on said receiving circuit including retardation means adapted to be progressively retarded for progressively retarding said second direct wave for effecting a synchronism between the second direct wave and the reflected wave and means for indicating when said progressively changing retardation has brought about a synchronism including a discharge tube adjusted to respond to the frequency of the waves.

9. In a system for measuring distance by the aid of emitted and reflected electromagnetic waves in which periodic electromagnetic wave signals are emitted, means for receiving the direct and reflected wave, means for receiving a second direct wave on said receiving circuit including retardation means adapted to be progressively retarded for progressively retarding said second direct wave for effecting a synchronism between the second direct wave and the reflected wave and means for indicating when said progressively changing retardation has brought about a synchronism including a circuit having an adjustable grid bias responding only when a synchronism is reached and a discharge tube visually indicating said response.

10. A method of measuring distance comprising emitting periodically wave impulses, receiving a direct and a reflected wave impulse after reflection from the object whose distance is to be measured, progressively retarding in a cycle one set of said impulses, each successive impulse being retarded a uniformly greater amount than the previous one in the cycle, producing an indication by the synchronism of the direct and reflected impulses at a definite point of the retarding cycle and measuring the distance through the observation of the point of synchronism in the retarding cycle.

11. A method of measuring distance comprising emitting periodically wave impulses, receiving a direct and a reflected wave impulse after reflection from the object whose distance is to be measured, progressively retarding in a cycle said reflected impulses, each successive impulse being retarded a uniformly greater amount than the previous one in the cycle, producing an indication by the synchronism of the direct and reflected impulses at a definite point of the retarding cycle and measuring the distance through the observation of the point of synchronism in the retarding cycle.

12. The method of measuring distance comprising emitting periodically electromagnetic wave impulses of a frequency of the magnitude of approximately five meters at a period not less than twice the time interval needed for the electromagnetic impulse to travel to the most distant reflecting surface it is desired to measure, receiving a direct and a reflected impulse, progressively retarding in a cycle of a different and slower order of magnitude one set of said impulses, each successive impulse being retarded a uniformly greater amount than the previous one in the cycle, producing an indication by the synchronism of the direct and reflected impulses at a definite point of the retarding cycle and measuring the distance through the observation of the point of synchronism in the retarding cycle.

13. The method of measuring distance comprising emitting periodically electromagnetic wave impulses of a frequency of the magnitude of approximately five meters, at a period not less than twice the time interval needed for the electromagnetic impulse to travel to the most distant reflecting surface it is desired to measure, receiving a direct and a reflected impulse, progressively retarding in a cycle of a different and slower order of magnitude one set of said impulses, each successive impulse being retarded a slightly greater amount than the previous one in the cycle, producing an indication by the synchronism of the direct and reflected impulses at a definite point of the retarding cycle and measuring the distance through the observation of the point of synchronism in the retarding cycle.

14. The method of measuring distance comprising emitting periodically electromagnetic wave impulses of a frequency of the magnitude of approximately five meters at a period not less than twice the time interval needed for the electromagnetic impulse to travel to the most distant reflecting surface it is desired to measure, receiving a direct and a reflected impulse, progressively retarding in a cycle of sufficiently rapid period to sustain a continuous visual indication one set of said impulses, each successive impulse being retarded a slightly greater amount than the previous one in the cycle, producing a continuous indication by the synchronism of the direct and reflected impulses at a definite point of the retarding cycle and measuring the distance through the observation of the point of synchronism in the retarding cycle.

EZEKIEL WOLF.